(12) United States Patent
Haugan

(10) Patent No.: US 10,862,300 B2
(45) Date of Patent: Dec. 8, 2020

(54) POWER DISTRIBUTION SYSTEM

(71) Applicant: Siemens Aktiengesellschaft, Munich (DE)

(72) Inventor: Espen Haugan, Trondheim (NO)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 16/493,087

(22) PCT Filed: Feb. 14, 2018

(86) PCT No.: PCT/EP2018/053630
§ 371 (c)(1),
(2) Date: Sep. 11, 2019

(87) PCT Pub. No.: WO2018/171979
PCT Pub. Date: Sep. 27, 2018

(65) Prior Publication Data
US 2020/0119548 A1    Apr. 16, 2020

(30) Foreign Application Priority Data
Mar. 21, 2017   (EP) ..................... 17162169

(51) Int. Cl.
*H02J 1/10*    (2006.01)
*H02J 7/34*    (2006.01)

(52) U.S. Cl.
CPC . *H02J 1/10* (2013.01); *H02J 7/34* (2013.01)

(58) Field of Classification Search
CPC ..................... H02J 1/10; H02J 7/34
See application file for complete search history.

(56) References Cited

U.S. PATENT DOCUMENTS 4,594,650 A * 6/1986 Kinbara .............. H02M 1/34
                                                    361/111
9,590,419 B2 * 3/2017 Boe .................... H03K 17/18
(Continued)

FOREIGN PATENT DOCUMENTS

WO    2016131460 A1    8/2016

OTHER PUBLICATIONS

International search report and written opinion dated Apr. 17, 2018, for corresponding PCT/EP2018/053630.

*Primary Examiner* — Jared Fureman
*Assistant Examiner* — Michael J Warmflash
(74) *Attorney, Agent, or Firm* — Wolter Vandyke Davis, PLLC

(57) ABSTRACT

A DC power distribution system includes a plurality of power sources and a DC power distribution bus having a plurality of DC bus sections. At least one power source is coupled to each of the DC bus sections. One or more power switching assemblies couple one of the DC bus sections to another. The power switching assembly has first and second terminals, the first terminal being electrically coupled to a first bus section and the second terminal being electrically coupled to a second bus section. First and second semiconductor devices are electrically coupled between the first and second terminal to control current flow between the first terminal and the second terminal. At least one power switching assembly further includes a pair of current limiters coupled between the first and second semiconductor devices and an energy store is coupled to that power switching assembly between the pair of current limiters.

11 Claims, 4 Drawing Sheets

(56) References Cited

U.S. PATENT DOCUMENTS

| | | | |
|---|---|---|---|
| 10,483,765 B2* | 11/2019 | Pedersen | E21B 41/00 |
| 10,651,838 B2* | 5/2020 | Haugan | H03K 17/08148 |
| 2013/0187451 A1* | 7/2013 | Boe | H03K 17/66 307/11 |
| 2019/0363628 A1* | 11/2019 | Haugan | H02J 1/00 |
| 2019/0363707 A1* | 11/2019 | Haugan | H02H 7/268 |

* cited by examiner

POWER DISTRIBUTION SYSTEM

CROSS REFERENCE TO RELATED APPLICATIONS

This application is the US National Stage of International Application No. PCT/EP2018/053630 filed Feb. 14, 2018, and claims the benefit thereof. The International Application claims the benefit of European Application No. EP17162169 filed Mar. 21, 2017. All of the applications are incorporated by reference herein in their entirety.

FIELD OF INVENTION

This invention relates to a direct current (DC) power distribution system, in particular for an offshore platform or vessel.

BACKGROUND OF INVENTION

On offshore platforms or vessels, much equipment is deemed to be critical and regulatory requirements specify the availability of power in the event of a fault. Consequentially, it has been normal practice to separate the vessel equipment into sections and provide separate power to each section, with redundancy, so that if a fault occurs in one section, it does not transfer to the other and not all operational capability is lost. This separation has been achieved by operating with bus ties between the sections normally open and only in limited circumstances closing those bus ties to enable one side to receive power from the other. In addition to redundancy of the main energy sources, there are many other components which must be provided on each side of the system, so that they continue to be available in the event of a fault on one side. This all adds to the cost and complexity of the systems.

SUMMARY OF INVENTION

In accordance with a first aspect of the present invention a DC power distribution system comprises a plurality of power sources; a DC power distribution bus comprising a plurality of DC bus sections; wherein at least one power source is coupled to each of the DC bus sections; the system further comprising one or more power switching assemblies; wherein a power switching assembly couples one of the plurality of DC bus sections to another of the plurality of DC bus sections; wherein the power switching assembly comprises a first terminal and a second terminal, the first terminal being electrically coupled to a first bus section of the power distribution bus and the second terminal being electrically coupled to a second bus section of the power distribution bus; and a first semiconductor device and a second semiconductor device electrically coupled between the first terminal and the second terminal to control current flow between the first terminal and the second terminal; wherein at least one power switching assembly further comprises a pair of current limiters coupled between the first and second semiconductor devices; and wherein an auxiliary energy store is coupled to that power switching assembly between the pair of current limiters.

Advantageously, the first and second semiconductor devices each comprise a first pair of series connected semiconductor devices.

Advantageously, the first semiconductor device and one of the pair of current limiters, or the second semiconductor device and the other of the pair of current limiters are configured to act as a DC to DC converter.

In one embodiment, one of the pair of current limiters of the power switching assemblies is connected on one side between the series connected semiconductor devices and on the other side to the other of the pair of current limiters.

This forms a two quadrant device, controlling DC to DC conversion from the energy store to the DC bus voltage.

The power switching assembly may comprise a first DC to DC converter comprising a first pair of series connected semiconductor devices and a second pair of series connected semiconductor devices coupled together by one of the pair of current limiters, one terminal of the current limiter being connected to a common point between an output of one of the semiconductor devices of the first series connected pair and an input of the other of the semiconductor devices of the first series connected pair, the other terminal of the current limiter being connected to a common point between an output of one of the semiconductor devices of the second series connected pair and an input of the other of the semiconductor devices of the second series connected pair.

The power switching assembly may further comprise a second DC to DC converter comprising a first pair of series connected semiconductor devices and a second pair of series connected semiconductor devices coupled together by the other of the pair of current limiters, one terminal of the current limiter being connected to a common point between an output of one of the semiconductor devices of the first series connected pair and an input of the other of the semiconductor devices of the first series connected pair, the other terminal of the current limiter being connected to a common point between an output of one of the semiconductor devices of the second series connected pair and an input of the other of the semiconductor devices of the second series connected pair.

This provides a four quadrant circuit providing bi-directional DC to DC conversion between the energy store and the DC bus voltage.

The first and second DC to DC converters may be coupled between the terminals of the power switching assembly; and, the auxiliary energy store may be coupled between the first and second DC to DC converters.

Advantageously, the or each semiconductor device comprises an insulated gate bipolar transistor.

Advantageously, the power source comprises one of a prime mover, a generator, or an energy store.

Advantageously, the voltage at one side of the power switching assembly is greater than or equal to 1 KV.

Advantageously, the voltage at one side of the power switching assembly is within the range 1 KV to 15 KV.

BRIEF DESCRIPTION OF THE DRAWINGS

An example of a DC power distribution system according to the present invention will now be described with reference to the accompany drawings in which.

DETAILED DESCRIPTION OF INVENTION

DC power distribution systems on offshore vessels, or platforms, or remote drilling rigs, typically comprise a power source such as a prime mover, a generator, or an energy store, together with DC bus sections which are joined by a bus tie switch. In order to meet regulatory requirements for safe operation, the bus tie switch must be able to disconnect the DC bus sections from one another to prevent a fault on one side of the system from propagating to the other side and potentially losing all power to critical systems, such as thrusters or essential parts of the drilling equipment. However, there may also be components which are useful in normal operation, but not essential to critical operations, for example auxiliary energy storage, such as batteries, which may store excess energy produced when running a motor at full load, or store regenerated energy during drilling operations with active heave compensation. The present invention aims to reduce size, cost and complexity of the conventional system.

Figure 1:
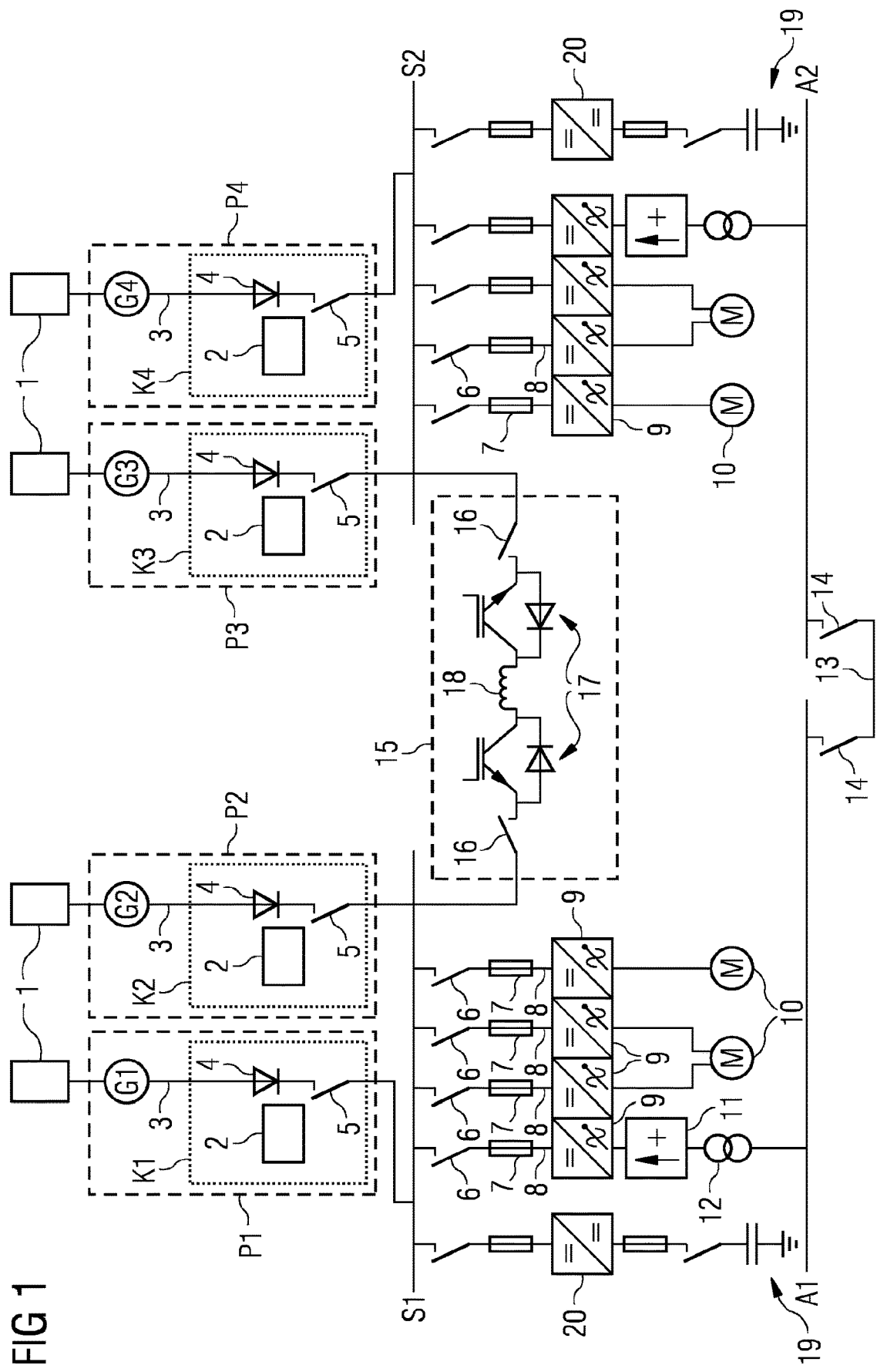
FIG. 1 illustrates an example of circuitry for a low voltage diesel electric propulsion system.

Typically, a bus tie switch or breaker function is provided for AC distribution (high and low voltage) solutions with mechanical breakers or low voltage DC distribution systems, typically up to 1000V DC, such as that shown in FIG. 1. Currently, there are limited options available for high voltage static DC switches for use in marine and offshore systems. High voltage equivalents, typically for operation at 15 kV are not available. Where two independently operating power systems are required to meet classification standards, there is a need for very fast disconnection of DC bus tie connections to prevent faults from propagating from one side to another. Existing low voltage bus tie switches are not able to operate at voltages above 1000V and certainly not for voltage in the region of 10 kV to 15 kV, or higher.

In addition, in offshore systems which incorporate redundancy, i.e. overcapacity of critical components in order to allow for failure, such as redundant thrusters for use in case of failure of a main thruster, the redundant component, although necessary to comply with regulatory standards, may not often be used. Furthermore, associated equipment, such as energy storage, DC to DC conversion for that energy storage and other equipment required as part of the redundant system, increase costs. As these pieces of equipment may not always, or even, often, be in use, a design which removes the need for some of the associated equipment altogether is desirable.

FIG. 1 illustrates a typical diesel electrical propulsion system based on DC distribution with a static bus tie breaker, or switch that is based on IGBTs in an on, or off position, but no switching. An energy store, for example a battery, capacitors, flywheel, or other types of storage, with a DC/DC converter is placed on both main switchboards. The diesel electric propulsion system of FIG. 1 is based on low voltage DC distribution and comprises a plurality of diesel engines 1, each connected to a generator G1, G2, G3, G4 within respective generator protections systems P1, P2, P3, P4. The generator protection systems include a generator cubicle K1, K2, K3, K4 incorporating generator control 2. Each generator is coupled to DC main switchboard S1, S2 via line 3 which includes a diode 4 and isolation switch 5. Generators G1 and G2 are coupled to switchboard S1. Generators G3 and G4 are coupled to switchboard S2. From each of the switchboard S1, S2, switches 6 and fuses 7 are provided in lines 8 to inverters 9 between the DC main switchboard and motors 10, or to a shaft generator with motor function, which is coupled to AC auxiliary switchboard A1, A2 via filter 11 and transformer 12. In addition, the DC main switchboard S1, S2 supplies a battery 19 through a DC to DC converter 20. The AC auxiliary switchboard is coupled via bypass 13 and isolation switches 14. The DC main switchboard is connected via bus tie switch 15 comprising an isolation switch 16 and transistor diode arrangement 17 at each side of a Di/dt reactor 18

The example of FIG. 1 may be adapted for medium, or high, voltage DC distribution by replacing the bus tie switch 15 with a power switching assembly 22 as described hereinafter. The battery 19 is an example of an auxiliary energy store, which it is desirable to maintain access to in the event of a fault and so this auxiliary energy store has traditionally been provided on each side of the system, as the faulty side cannot be determined in advance. The present invention provides further reductions in cost and complexity by means of a bus tie power switching assembly which incorporates connections to the auxiliary energy store, so that a single, common, auxiliary energy store may be provided making use of components in the power switching assembly in order to carry out DC to DC conversion, in place of auxiliary energy stores on both sides, with corresponding DC to DC converters and other associated components on both sides. The invention may also be used in a similar way to simplify and reduce associated equipment for a main energy store, for example in the case of a fully electric vessel, which uses an energy storage system to provide propulsion, or power main equipment, rather than just for auxiliaries.

Figure 2:
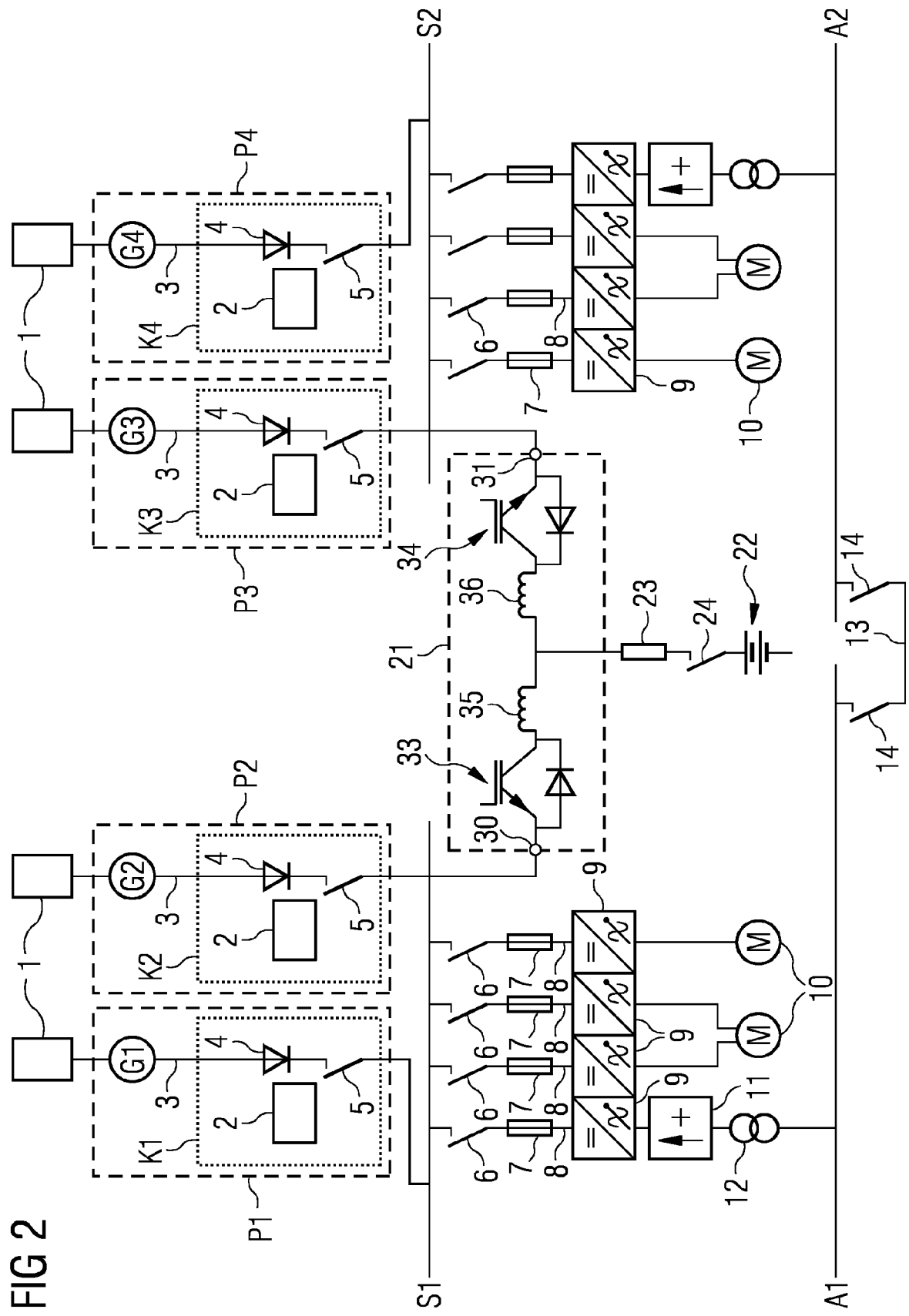
FIG. 2 shows an example of a power distribution system according to the invention, suitable for a wide range of voltages.

As illustrated in FIG. 2, there is no need for each side of the DC main switchboard S1, S2 to supply an energy store through a converter, as is done in the FIG. 1 example. Instead, the design of the power switching assembly 21 is adapted to provide DC to DC conversion for a common energy store 22, as well as acting as a bus tie breaker. Semiconductor devices, such as diodes or transistors, or a combination thereof in combination with current limiters, such as an inductance, or choke provide both switching and DC to DC conversion for the energy store 22. Typically, a fuse 23 and isolator 24 are provided in the line between the power switching assembly 21 and the energy store 22. The power switching assembly couples one of the plurality of DC bus sections S1, S2 to another of the plurality of DC bus sections by means of a first semiconductor device 33 and a second semiconductor device 34 electrically coupled between a first terminal 30 and a second terminal 31 of the power switching assembly 21. This allows current flow between the first terminal and the second terminal to be controlled, but also, in combination with a pair of current limiters 35, 36 coupled between the first and second semiconductor devices 33, 34, allows the auxiliary energy store 22 to be coupled to that power switching assembly 21 between the pair of current limiters 35, 36.

Figure 3:
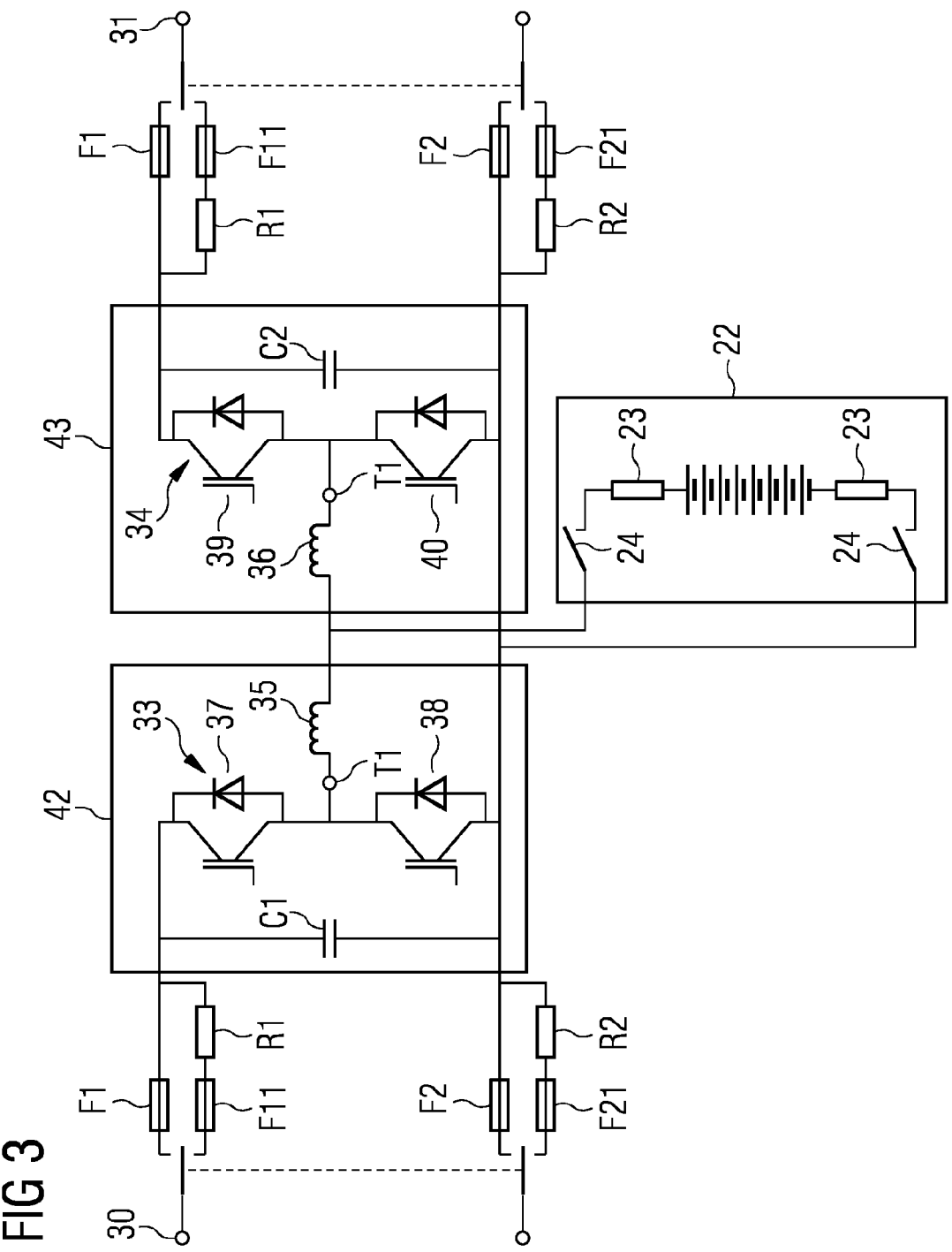
FIG. 3 illustrates in more detail one example of a connection between the DC bus sections of the power distribution system of FIG. 2 and an energy store; and, FIG. 4 illustrates in more detail another example of a connection between the DC bus sections of the power distribution system of FIG. 2 and an energy store.
Figure 4:
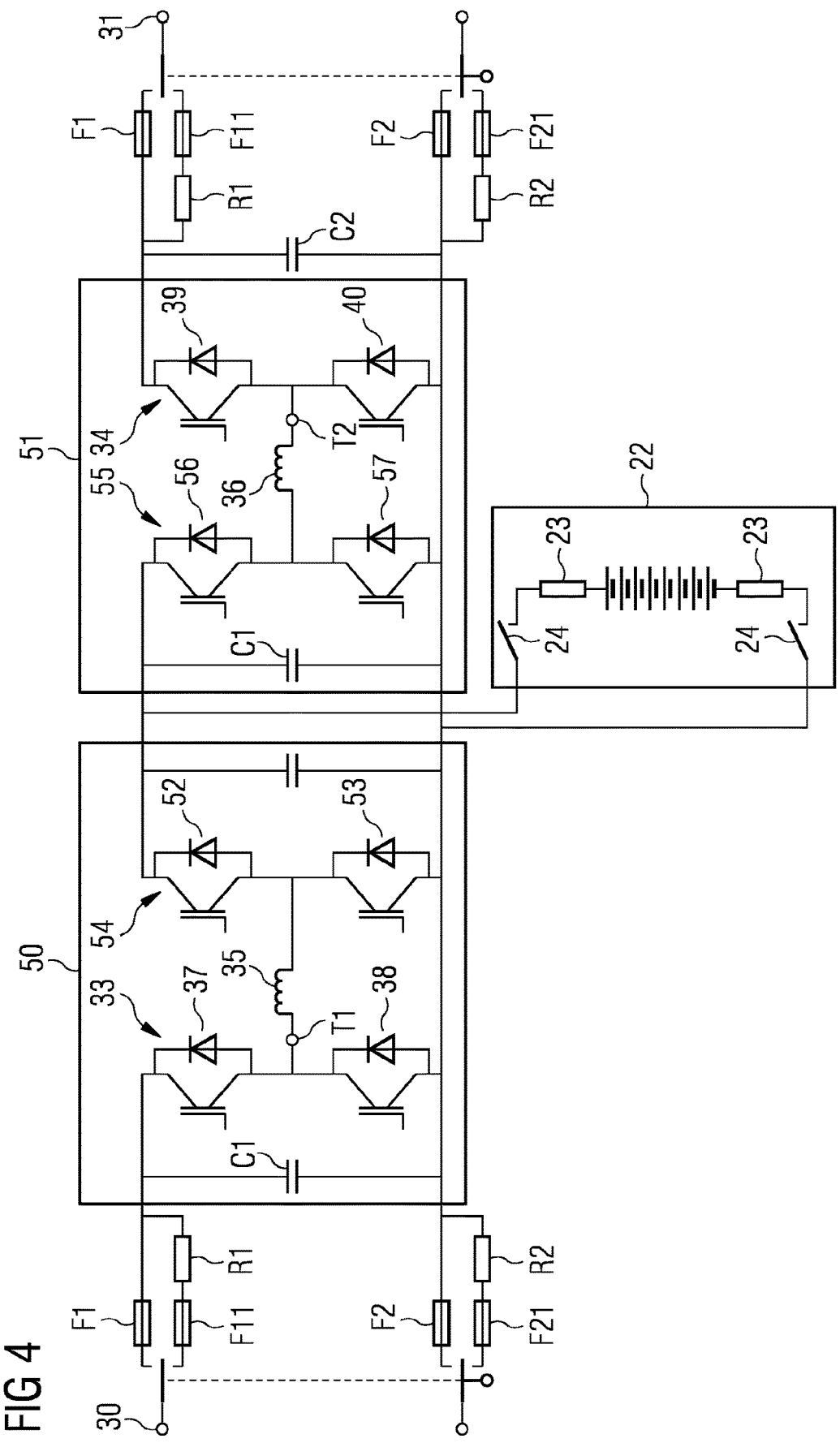

The power switching assembly 21 is illustrated in more detail in FIGS. 3 and 4. A first example, shown in FIG. 3, is a two quadrant solution, which is able to act as a switch to disconnect one DC bus section S1, S2 from another bus section S2, S1 in the event of a fault and also to do step up conversion of DC from the energy store 22 to the DC voltage on the DC bus sections S1, S2. For example, in a DC main switchboard operating at 1 KV, the voltage in the energy store 22 may be at 700V, so DC to DC conversion from the battery voltage of 700V to 1 KV is required. The DC to DC converters 42, 43 each comprise a current limiter 35, 36 and semiconductor device 33, 34. The DC to DC converters are coupled together via the current limiters 35, 36 and the auxiliary energy store 22 is connected between the current limiters. Fuses 23 and isolation switches 24 are typically provided at each end of the energy store. The first and second semiconductor devices 33, 34 may each comprise a first pair of series connected semiconductor devices 37, 38 and combined with one of the pair of current limiters 35, 36, are configured to act as a DC to DC converter. When one of the pair of current limiters 35, 36 of the power switching assemblies is connected on one side (between the series connected semiconductor devices 37, 38, 39, 40 and on the other side to the other of the pair of current limiters 35, 36, DC to DC step up conversion is possible, from the DC voltage of the energy store 22 to the DC bus voltage. T1 illustrates a DC current sensor to detect the current at that point. If a short circuit occurs on one side, then the DC voltage goes to zero, which may be a problem if the power requirement is high. The energy store is protected by the fuse 23, which blows if one side shorts. This is acceptable for situations where the energy store is being used for non-critical operation. When the fault has been cleared, the fuses can be replaced and the supply from the side which did not have the short continues unaffected because the switch has opened sufficiently quickly to prevent the fault from spreading from one side of the DC bus S1, S2 to the other. Optionally, a capacitor ( )C1, C2 may be provided in parallel with the semiconductor devices. The function of the capacitors is to allow fast switching of the transistors, as the transistors have to avoid inductivity in series between capacitor and transistor when switching fast to prevent damaging overvoltages occurring. On one side of the DC to DC converters 42, 43 are connections (to the DC main switchboard S1, S2 via fuse F1 and fuse F11 and resistor R1 in series on the high pole, fuse F2 and fuse F21 and resistor R2 on the low pole. The R1/R2 illustrates a typical pre-charge solution for the capacitors C1/C2—in normal operation the fuse F1 conducts the current. The dotted line illustrates that the mechanical switch is operated with the same mechanical open/closing mechanism for both the positive and the negative pole and that it is not possible to operate them individually.

In the example of FIG. 4, the power switching assembly may comprise a first DC to DC converter 50 comprising a first pair 33 of series connected semiconductor devices 37, 38 as in the FIG. 3 example and a second pair of series connected semiconductor devices 52, 53 coupled together by one 35 of the pair of current limiters, one terminal of the current limiter being connected to through a DC current sensor T1 at a common point between an output of one of the semiconductor devices 37 of the first series connected pair 33 and an input of the other of the semiconductor devices 38 of the first series connected pair 33, the other terminal of the current limiter being connected via a DC current sensor at a common point between an output of one of the semiconductor devices 52 of the second series connected pair 54 and an input of the other of the semiconductor devices 53 of the second series connected pair. This arrangement is mirrored on the other side of the power switching assembly, where a second DC to DC converter S1 may be provided comprising a first pair 34 of series connected semiconductor devices 39, 40 and a second pair 55 of series connected semiconductor devices 56, 57 coupled together by the other 36 of the pair of current limiters, one terminal of the current limiter being connected to a common point T2 between an output of one of the semiconductor devices 39 of the first series connected pair and an input of the other of the semiconductor devices 40 of the first series connected pair, the other terminal of the current limiter 36 being connected to a common point between an output of one of the semiconductor devices 56 of the second series connected pair 55 and an input of the other of the semiconductor devices 57 of the second series connected pair.

This four quadrant circuit provides bi-directional DC to DC conversion between the energy store and the DC bus voltage to both sides of the DC bus, as well as the bus tie breaker function. The two sides of the DC main switchboard S1, S2 run independent of one another, with respect to voltage.

The present invention reduces the volume, size, cost and complexity of providing a DC supply to a consumer by altering the power switching assembly to enable it to store and/or retrieve energy directly from the energy store via the bus tie breaker, rather than needing a separate energy store connected each DC switchboard. This is particularly important in offshore systems which incorporate redundancy, i.e. overcapacity of critical components in order to allow for failure, such as redundant thrusters for use in case of failure of a main thruster, as the redundant component, although necessary to comply with regulatory standards, may not often be used. The more associated equipment that is also required for that redundant component, the greater the cost, for something which is not always in use, so a design which excludes some of the associated equipment altogether is desirable. Retro-fitting of a power switching assembly according to the invention is possible with existing redundant systems to free up more space and reduce maintenance requirements. The present invention has the advantages that it can be used over a wide range of voltages, both for low voltages, typically below 1 KV and for medium and high voltages, up to 10 kV to 15 kV, or higher.

The invention claimed is:

1. A DC power distribution system, comprising:
   a plurality of power sources;
   a DC power distribution bus comprising a plurality of DC bus sections;
   wherein at least one power source is coupled to each of the DC bus sections;
   the system further comprising one or more power switching assemblies;
   wherein a power switching assembly couples one of the plurality of DC bus sections to another of the plurality of DC bus sections;
   wherein the power switching assembly comprises a first terminal and a second terminal, the first terminal being electrically coupled to a first bus section of the power distribution bus and the second terminal being electrically coupled to a second bus section of the power distribution bus; and
   a first semiconductor device and a second semiconductor device electrically coupled between the first terminal and the second terminal to control current flow between the first terminal and the second terminal;
   wherein at least one power switching assembly further comprises a pair of current limiters coupled between the first and second semiconductor devices;
   wherein an energy store is coupled to that power switching assembly between the pair of current limiters; and
   wherein the power switching assembly comprises a first DC to DC converter comprising a first pair of series connected semiconductor devices and a second pair of series connected semiconductor devices coupled together by one of the pair of current limiters, one terminal of the current limiter being connected to a common point between an output of one of the semiconductor devices of the first series connected pair and an input of the other of the semiconductor devices of the first series connected pair, the other terminal of the current limiter being connected to a common point between an output of one of the semiconductor devices of the second series connected pair and an input of the other of the semiconductor devices of the second series connected pair.

2. The system according to claim 1, wherein the first and second semiconductor devices each comprise a first pair of series connected semiconductor devices.

3. The system according to claim 1, wherein the first semiconductor device and one of the pair of current limiters, or the second semiconductor device and the other of the pair of current limiters are configured to act as a DC to DC converter.

4. The system according to claim 1, wherein one of the pair of current limiters of the power switching assemblies is connected on one side between the series connected semiconductor devices and on the other side to the other of the pair of current limiters.

5. The system according to claim 1, wherein the assembly further comprises a second DC to DC converter comprising a first pair of series connected semiconductor devices and a second pair of series connected semiconductor devices coupled together by the other of the pair of current limiters, one terminal of the current limiter being connected to a common point between an output of one of the semiconductor devices of the first series connected pair and an input of the other of the semiconductor devices of the first series connected pair, the other terminal of the current limiter being connected to a common point between an output of one of the semiconductor devices of the second series connected pair and an input of the other of the semiconductor devices of the second series connected pair.

6. The system according to claim 5, wherein the first and second DC to DC converters are coupled between the terminals of the power switching assembly; and, wherein the energy store is coupled between the first and second DC to DC converters.

7. The system according to claim 1, wherein the or each semiconductor device comprises an insulated gate bipolar transistor.

8. The system according to claim 1, wherein the power source comprises one of a prime mover, a generator, or an energy store.

9. The system according to claim 1, wherein the voltage at one side of the power switching assembly is greater than or equal to 1 KV.

10. The system according to claim 1, wherein the voltage at one side of the power switching assembly is within the range 1 KV to 15 KV.

11. The system according to claim 1, wherein the energy store is an auxiliary energy store.

* * * * *